United States Patent
Jones

[11] 3,727,925
[45] Apr. 17, 1973

[54] ANTIBLOW-BY RINGS
[75] Inventor: David W. Jones, Long Island, N.Y.
[73] Assignee: C. E. Conover & Co., Inc., Fairfield, N.J.
[22] Filed: Dec. 22, 1970
[21] Appl. No.: 100,649

[52] U.S. Cl. ................277/165, 92/185, 277/176, 277/177, 277/188
[51] Int. Cl. ................................F16j 15/46
[58] Field of Search.................92/182, 184, 185; 277/68–70, 79, 165, 176, 177, 188, 187, 216

[56] References Cited

UNITED STATES PATENTS 3,033,578  5/1962  Kellogg.........................277/165 X
2,520,306  8/1950  Detweiler......................277/188 X
3,328,041  6/1967  Bloom et al...................277/165

Primary Examiner—Houston S. Bell, Jr.
Attorney—Sandoe, Hopgood & Calimafde

[57] ABSTRACT

This invention is an improvement in cap type seals that are used with O-rings. It provides a special ring, in the end of a groove that holds the seal, with radial passages in the special ring for equalizing pressure above and below the cap to prevent collapsing of the O-ring and failure of the seal under severe operating conditions, such as high amplitude pressure reversals that are so rapid that the seal does not have time to move and admit pressure to the clearance under the seal before the high pressure impulse of the reversal drives the seal down.

10 Claims, 9 Drawing Figures

PATENTED APR 17 1973　　　　　　　　　　　　　　　3,727,925

INVENTOR
David W. Jones
BY Sandoe, Hopgood
& Calimafde
ATTORNEYS 3,727,925

ANTIBLOW-BY RINGS

BACKGROUND AND SUMMARY OF THE INVENTION

Cap type seals that are used with O-rings fail without any apparent damage or permanent distortion of the seal when used under certain conditions to seal pressure that reverses in direction rapidly and with high amplitude.

The pressure reversal is so sudden, and the pressure build-up in the new direction is so rapid, that the pressure above the cap builds up before the cap has time to move away from the end of the seal groove to permit pressure to also reach the space in the groove under the cap. The high pressure above the cap, without compensating pressure under the cap, causes the cap to force the O-ring down and to collapse the O-ring so that the fluid can blow by the seal across the top of the cap.

Various expedients have been suggested to overcome this problem, but all of these expedients have had serious drawbacks, such as weakening of the structure, inadequate cross section for fluid flow, and excessive cost.

The invention of this application provides additional rings, referred to herein as "antiblow-by rings", one of which is fitted into one end or both ends of the groove that holds the cap and its O-ring. The antiblow-by rings are quite thin but they prevent the caps from coming into contact with the end of the seal-holding grooves; and they are shaped to maintain radial passages between the ends of the cap and the ends of the groove so that no matter how quickly the pressure reverses at the top of the groove, there is clearance between the end of the cap and the ends of the groove for flow of fluid into the space under the cap. This prevents the O-ring from being driven down and a clearance from being opened between the cap and the wall of the cylinder or other surface against which the cap is sealing.

The antiblow-by rings of this invention can be used with conventional type cap and O-ring seals and they make such seals effective for operation under a wider spectrum of operating conditions, and at low cost.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF THE PREFERRED EMBODIMENT

Figure 1:
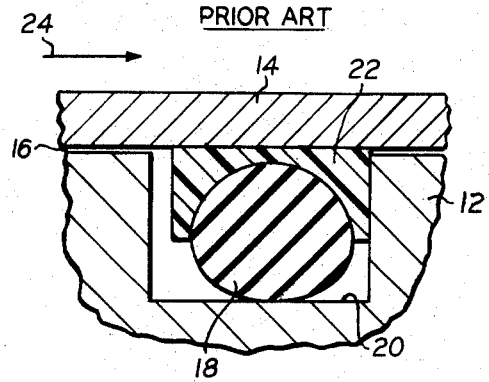
FIG. 1 is a sectional view of a conventional cap and O-ring seal of the prior art.

FIG. 1 shows a portion of a piston 12 which reciprocates in a cylinder 14. There is a clearance 16 between confronting surfaces of the piston 12 and the wall of the cylinder 14. This clearance is sealed by a cap and O-ring seal including an O-ring 18 located in a groove 20 formed in the piston 12 and extending circumferentially around the full circumference of the piston. A cap 22 is located on top of the O-ring 18 and bears against the cylinder wall with some pressure as the result of squeeze of the O-ring.

The groove 20 has a length somewhat less than the length of the cap 22, and has ends 23 on opposite sides of the O-ring 18. When the pressure is from the side indicated by the arrow 24, the O-ring 18 and the cap 22 move as a unit toward the right hand end of the groove 20; and when the pressure is from the other side, the O-ring 18 and the cap 22 shift to the left hand end of the groove 20. This is the conventional operation of a cap type seal using an O-ring and its operation is well understood in the art.

Figure 2:
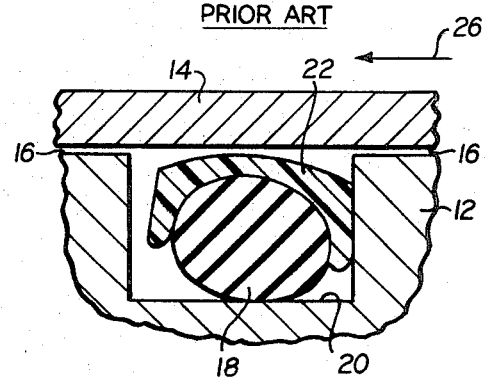
FIG. 2 illustrates the way in which the sealing device of FIG. 1 fails to seal under certain conditions of pressure reversal.

Under certain circumstances the cap type seal of FIG. 1 is unsatisfactory. These circumstances are illustrated in FIG. 2. The pressure in FIG. 2 has been reversed as compared to FIG. 1 and as indicated by the direction of the pressure arrows 26. If this reversal in pressure is very sudden and the pressure is sufficiently high, the cap and O-ring do not have time to move toward the left before the pressure at the top of the cap increases to such a magnitude that it pushes the cap down and compresses the O-ring 18 sufficiently to cause the O-ring to collapse so that the cap 22 moves away from the cylinder wall and leaves clearance between the cap and the cylinder wall for escape of pressure across the top of the seal. Even though the seal in FIG. 2 has not been damaged and has not been permanently distorted, it fails as a seal under the conditions described.

One expedient for preventing the action illustrated in FIG. 2 has been to provide notches in the end wall of the cap. The notches do permit pressure to be established under the cap but there are a number of disadvantages in using such notches. The notches create fracture points in the ring making installation much more difficult and seal destruction a factor. On an impulsing application, the material of the cap can cold flow closing the notches and the antiblow-by characteristic returns. Also, notching the seal is a delicate secondary operation which appreciably increases the cost. A limited number of notches can be used without too much danger but the number must be limited and this creates a problem at low temperatures where the fluid becomes more viscous and flows more slowly through the cross sections of the limited orifices.

Another expedient has been to provide notches in the end wall of the groove. This has a number of disadvantages. It can only be used on a piston or outside diameter type seal groove. The method does not lend itself to the gland or inside diameter seals. It entails an expensive operation. Because of the expense, only a limited number of notches are economically feasible.

Figure 3:
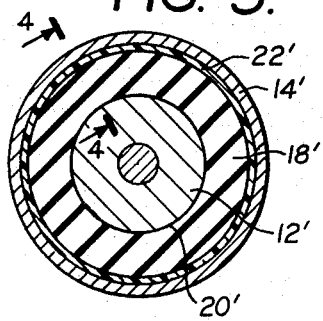
FIG. 3 is a sectional view, on a reduced scale, showing a seal equipped with antiblow-by rings in accordance with this invention, part of the section of FIG. 3 being taken on the line 3—3 of FIG. 4 but extending beyond line 3—3 to show the full diameter of the parts.
Figure 4:
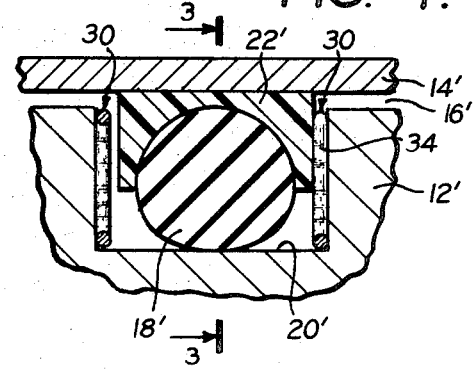
FIG. 4 is a sectional view on the line 4—4 of FIG. 3, the parts being shown on a larger scale and on one side only of the seal.
Figure 5:
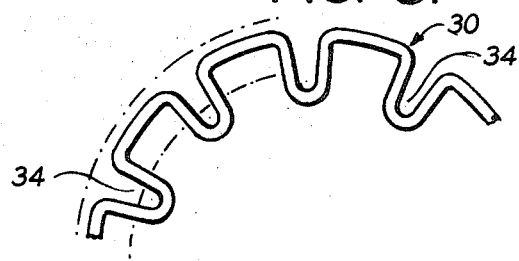
FIG. 5 is a fragmentary enlarged view of part of the antiblow-by ring shown in FIGS. 3 and 4.

FIGS. 3 and 4 show the way in which the problem presented in FIG. 2 is solved by the present invention. A ring 30 is placed against each of the ends 23' of the groove 20'. The groove, O-ring and cap in FIGS. 4 and 5 are indicated by the same reference characters as in FIGS. 1 and 2 but with a prime appended. The ring 30 is formed from a piece of wire or similar stiff resilient material bent to the shape shown in FIG. 5 to provide passages 34 extending radially inward from the circumference of the ring to a location substantially below the cap 22 and preferably the bends in the wire which form the passages 34 reach all the way to the bottom of the groove 20', as indicated in FIG. 4.

The rings 30 hold the ends of the cap 22' out of contact with the end walls of the groove 20'. Thus the cap cannot seal the pressure so that there is no opportunity for the fluid to build up pressure under the cap 22 when there is a sudden surge of pressure on the upper part of the seal. Fluid flows down passages 34 and spreads axially under the cap 22' and throughout the space under the cap between the O-ring 18', the bottom of the groove 20' and the end wall of the groove against which the ring 30 is placed.

In the construction shown, the rings 30 are held against the end walls of the groove 20' by the end faces of the cap 22' itself. This is a practical construction which requires that the length of the groove 20' be greater than the length of the cap 22 by the thickness of two rings 30. In practice the rings 30 can be quite thin, for example of the order of 0.010 inch for standard grooves and other thicknesses for non-standard grooves.

In order to place one of the rings 30 in the groove 20', the wire of which the rings 30 are made can be sufficiently springy so that the bends in the wire permit the inside diameter of the ring to stretch enough for the ring to be passed over the piston 12' for insertion into the groove 20'. If made of wire too stiff for such an operation, the ring 30 can be made with one break in its continuity so that the ring can be opened up at this break either by expanding the circumference of the ring 30 or by distorting it to helical shape so as to insert the ring in the groove 20'.

Figure 6:
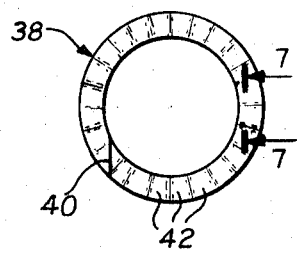
FIG. 6 is a view, on a reduced scale, showing a modified form of the antiblow-by ring of this invention.
Figure 7:
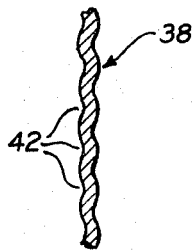
FIG. 7 is a greatly enlarged, fragmentary view of the construction shown in FIG. 6, the section being taken on the line 7—7 of FIG. 6.

FIGS. 6 and 7 show a modified form of the ring 30 shown in FIGS. 4 and 5. Instead of making the ring from wire bent to form the passages from the circumference downward to the area near the bottom of the seal groove, the ring 38 of FIGS. 6 and 7 is a washer with a split 40 located at one region of its circumference so that the washer can be distorted to a helical shape for inserting it into the groove in which the cap and seal are located. The ring 38 must be made of material which is sufficiently flexible to withstand distortion for insertion into the groove without becoming permanently bent because it is desirable to have the ring lie flat against the end wall of the groove. While the cap will exert some pressure to hold the ring against the end wall, it is objectionable to have pressure sufficient to provide substantial friction.

The ring 38 is used in the same way as the ring 30 already described; and the passages for permitting fluid flow from above the groove downward to the space under the cap are obtained by having corrugations 42 in the ring 38 and these corrugations are preferably radial. Thus the passages which are formed by the corrugations 42 are tapered and decrease somewhat in cross section as they extend radially inward.

Figure 8:
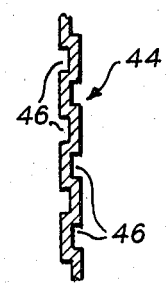
FIG. 8 is a view similar to FIG. 7 but showing a modified shape for the corrugations of the antiblow-by ring of FIG. 7.

FIG. 8 shows another modification in which a ring 44 is made with a corrugated contour but with square-sided corrugations 46 instead of rounded corrugations. These square-sided corrugations 46 provide the passages on both sides of the ring 44 for flow of fluid radially downward into the groove.

It will be evident that the passages 46 which are on the side of the ring confronting the end wall of the groove do not transmit any substantial amount of fluid into the groove if the inside diameter of the washer is substantially the same as the diameter of the bottom of the groove because there is no opportunity for free flow of fluid from the lower ends of the passages into the space under the cap 22. However, the passages 46 on the side of the ring 44 which confronts the cap 22 transmit fluid flow along the clearances between the passages 46 and the ends of the cap 22' until the fluid reaches the lower end of the cap 22'. Then the fluid can flow freely into the space under the cap from the passages 46 which are completely unconfined below the cap on the side facing the O-ring.

Figure 9:
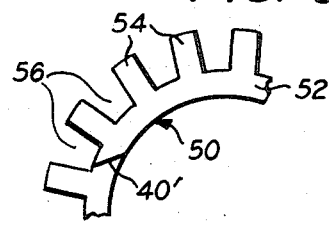
FIG. 9 is a fragmentary view on a reduced scale, showing another modification of the antiblow-by ring shown in FIG. 5.

FIG. 9 shows still another modified form of ring 50 which is also a washer having an inside diameter which is preferably equal to the diameter of the bottom of the groove so as to support the ring concentric with the piston or other part with which it is used. The ring 50 has a solid surface 52 extending upward to a level less than the height of the bottom of the cap above the bottom of the groove. There are then projections or extensions 54 somewhat similar to the teeth of a gear, extending radially outward from the solid portion 52 of the ring. The space between the extensions 54, indicated by the reference character 56, are the passages for the flow of fluid along the end faces of the cap 22 to the region below the cap. The ring 50 has a split 40'.

In the preferred construction, the cap 22' is made of polytetrafluoroethylene (TFE), and the O-ring 18' is a plastic elastomer having memory.

The preferred embodiments of the invention have been illustrated and described, but changes and modifications can be made and some features can be used in different combinations without departing from the invention as defined in the claims.

What is claimed is:

1. Apparatus for sealing the clearance between confronting surfaces, one of which has a groove therein, including in combination an O-ring in the groove and in contact with the bottom of the groove, a cap on the top of the O-ring with an outer surface of the cap in contact with the surface that confronts the grooved surface, the cap having end walls that confront the walls that form the ends of the groove and being of less length than the length of the groove and being movable as a unit with the O-ring toward one end of the groove or the other, depending upon the direction of pressure being sealed, the cap being supported by the O-ring with a clearance between the cap and the bottom of the groove, antiblow-by rings in contact with the ends of the groove on opposite sides of the cap and in position to hold the cap away from contact with the ends of the groove, each of said antiblow-by rings having passages therein extending from its upper limit towards the bottom of the groove and communicating with the clearance between the cap and the bottom of the groove to equalize the pressure above and under the cap on a side of the O-ring from which pressure is suddenly applied, whereby collapse of the O-ring against the bottom of the groove, by pressure on top of the cap, is prevented.

2. The combination described in claim 1 characterized by the groove being of channel cross sections with a bottom and side walls extending upwardly from the bottom on both sides of the groove, and the antiblow-by ring being supported by the bottom of the channel.

3. The combination described in claim 2 characterized by the groove having its end walls parallel to one another, the cap having end walls that are substantially parallel to one another and to the end walls of the groove, the antiblow-by ring also having surfaces parallel to the end faces of the groove and of a contour to hold the end face of the cap substantially parallel to the end wall of the groove when spaced therefrom by contact with the antiblow-by ring.

4. The combination described in claim 1 characterized by the antiblow-by ring being made of wire bent back and forth to form generally radially-extending portions of the wire angularly spaced from one another whereby the spaces between the adjacent portions of wire provide said passages.

5. The combination described in claim 1 characterized by the antiblow-by ring being corrugated with the corrugations depressed inward from at least one of the surfaces of the antiblow-by ring that contacts with the end of the groove and the end wall of the cap, whereby said depressed corrugations form the passages for fluid flow.

6. The combination described in claim 5 characterized by the confronting surfaces with the clearance between them being concentric cylindrical surfaces and the groove having a circumferential extent around the entire angular extent of the cylindrical surface in which the groove is formed, the antiblow-by ring being a washer, generally radial channels in at least one face thereof and closely spaced around the circumference of the washer, said channels constituting the passages of the antiblow-by ring, and the washer being flexible and having a split extending for the full radial extent at one region thereof for distorting the washer to fit it into the groove.

7. The combination described in claim 5 characterized by the antiblow-by ring having annular end faces and being corrugated by a generally sinusoidal contour corrugation providing a continually undulating surface that provides passages on both sides of the antiblow-by ring, said passages extending radially.

8. The combination described in claim 1 characterized by the confronting surfaces which have clearances between them being concentric cylindrical surfaces and the groove having a circumferential extent around the entire angular extent of the cylindrical surface in which the groove is formed, the antiblow-by ring being a washer, generally radial channels in at least one face thereof and closely spaced around the circumference of the washer, said channels constituting the passages of the antiblow-by ring, and the washer being flexible and having a split extending for the full radial extent at one region thereof for distorting the washer as necessary to fit it into the groove.

9. The combination described in claim 1 characterized by the confronting surfaces with the clearance between them being concentric cylindrical surfaces and the groove having a circumferential extent around the entire angular extent of the cylindrical surface in which the groove is formed, the antiblow-by ring being a washer having a substantially plane annular extent with parallel end faces and a solid radial extent from its inner pierphery to a location radially inward of the inner limits of the end walls of the cap, and angularly spaced, radially extending teeth on the washer projecting from the portion of solid radial extent to outer limits of the antiblow-by ring, the angular spacing between said teeth constituting the fluid passages of the antiblow-by ring.

10. The combination described in claim 9 characterized by a piston having a circumference that constitutes one of the cylindrical surfaces, and a cylinder in which the cylinder reciprocates and the wall of which constitutes the other cylindrical surface between which the clearance is to be sealed, the groove being in the circumference of the piston and being a circumferential groove of rectangular channel cross section, the diameter of the outer circumference of the antiblow-by ring being substantially equal to that of the piston and the diameter of the inner circumference of the antiblow-by ring being substantially equal to that of the bottom of the groove, the antiblow-by ring having a split at one location around its circumferential extent and being flexible so that it can be separated at said split and distorted to extend around the piston and into the groove of the piston, the cap having a depressed groove of substantially semi-circular cross section into which the upper part of the O-ring fits, and the cap extending at least half way down the height of the O-ring, said cap being made of polytetrafluoroethylene (TFE) material, and the O-ring being a plastic elastomer having memory.

* * * * *